Sept. 15, 1964 H. R. BRUET 3,148,569

COMBINED TRAVERSING AND THREAD-CUTTING MECHANISM

Filed Dec. 4, 1959 7 Sheets-Sheet 1

INVENTOR.
HENRI RENE BRUET,

BY Linton and Linton

ATTORNEYS.

COMBINED TRAVERSING AND THREAD-CUTTING MECHANISM

Filed Dec. 4, 1959 7 Sheets-Sheet 2

INVENTOR.
HENRI RENE BRUET,
BY
Linton and Linton
ATTORNEYS.

INVENTOR.
HENRI RENE BRUET,
BY
Linton and Linton
ATTORNEYS.

COMBINED TRAVERSING AND THREAD-CUTTING MECHANISM

Filed Dec. 4, 1959 7 Sheets-Sheet 4

INVENTOR.
HENRI RENE BRUET,
BY
Linton and Linton
ATTORNEYS.

Sept. 15, 1964 H. R. BRUET 3,148,569

COMBINED TRAVERSING AND THREAD-CUTTING MECHANISM

Filed Dec. 4, 1959 7 Sheets-Sheet 5

INVENTOR.
HENRI RENE BRUET,
BY
Linton and Linton
ATTORNEYS.

Sept. 15, 1964 H. R. BRUET 3,148,569

COMBINED TRAVERSING AND THREAD-CUTTING MECHANISM

Filed Dec. 4, 1959 7 Sheets-Sheet 6

INVENTOR.
HENRI RENE BRUET,
BY
Linton and Linton
ATTORNEYS.

Sept. 15, 1964 H. R. BRUET 3,148,569

COMBINED TRAVERSING AND THREAD-CUTTING MECHANISM

Filed Dec. 4, 1959 7 Sheets-Sheet 7

INVENTOR.
HENRI RENE BRUET,
BY
Linton and Linton
ATTORNEYS.

United States Patent Office 3,148,569
Patented Sept. 15, 1964

3,148,569

COMBINED TRAVERSING AND THREAD-CUTTING MECHANISM

Henri René Bruet, Paris, France, assignor to Etablissements A. Cazeneuve, La Plaine Saint-Denis, France, a company of France Filed Dec. 4, 1959, Ser. No. 857,407
Claims priority, application France Dec. 16, 1958
10 Claims. (Cl. 82—22)

The invention has for its object a combined traversing and thread-cutting mechanism, chiefly intended for slide lathes.

The chief mechanisms conventionally used for traversing and thread-cutting or pitch selection in slide lathes have included hitherto a master screw cooperating with half-nuts or with worm wheels adapted to be locked in position, said screw being used both for traversing and for thread-cutting, or else, two master screws serving respectively for traversing and for screw-cutting, or again, a master screw for thread-cutting and a traversing bar for actual traversing, which latter arrangement is more generally used in recent lathes.

By reason of the continuous progression towards greater accuracy and greater speed, such mechanisms are not abreast of the improvements brought otherwise to modern slide lathes.

The above-mentioned prior arrangements have numerous drawbacks as is well known to all those using machine-tools, said drawbacks including, chiefly, beyond their bulk and complexity which is the case of the double screw or of the screw associated with a traversing bar, the irregular and rapid wear of the parts, the vibratory behaviour of the arrangement and its lack of accuracy increasing with continued use and, as concerns the threads, the slowness, the difficulty and the inaccuracy in the execution of most threads.

The present improved mechanism permits a number of simplifications and cuts out the above-mentioned drawbacks.

It incorporates numerous and substantial advantages both from the standpoints of constancy of operation and of accuracy during a long life and from the standpoints of reliable behaviour of the parts of the lathe, easy operation and speed, ease and accuracy of execution, in the case of threads, whether of metric, British or any other pitch.

According to the invention and in a general sense, there is provided a gear train adapted to connect the feed and thread-cutting gear box with the saddle or with the slide, said chain being constituted by a compound train including a master screw meshing with a worm wheel actuating, through a gear wheel rigid therewith, a change gear, the axis of which is parallel with that of the worm wheel and which is associated with selecting means. The gears of said change gear mesh with further gear wheels forming a unit with discs provided with recesses and revolving freely coaxially with the worm wheel. One of the gear wheels considered meshes with a toothed wheel keyed to a shaft rotatably carried by the saddle, said shaft transferring the movement of the master screw through a preferably positive clutch, either towards the rack controlling the longitudinal movement of the saddle, or else, towards the threaded rod controlling the transverse carriage or cross-slide for the obtention of a transverse movement, or again, said shaft may remain mechanically independent of the saddle and cross-slide when the clutch is in its inoperative position.

In the arrangement disclosed, the pressures produced by the power transmitted to the saddle or to the cross-slide, starting from the feed and thread-cutting gear box, are exerted in particular on the teeth of the worm wheel and also, either on the teeth of the rack, or else, on the thread of the threaded rod controlling the cross-slide and said pressures are distributed in a manner such that the pressure applied to the sides of the teeth of the worm wheel forms only a slight percentage of the pressure exerted on the rack or on the threaded rod controlling the cross-slide. Said pressure is selected so that the rate of operation may remain normal, whereby the wear, in particular that to which said worm wheel is subjected, may be negligible, even after a long life.

The change gear provided with selecting means includes gear wheels meshing with the gear wheels of the associated unit which includes in addition the recessed discs. Said unit revolves freely over the shaft to which the worm wheel is keyed together with the gear controlling the change gear. The system including the change gear and the disc unit permits adjusting, on the one hand, during the transversing movement, the feed value selected in the feed and thread-cutting gear box and, on the other hand, it ensures, during the thread-cutting procedure, the reengagement with the thread of a metric, Whitworth or the like pitch selected out of the range of pitches corresponding to gear ratios provided between the gears of the above-mentioned change gear and cooperating disc unit.

In order to increase or decrease the feed selected in the feed and thread-cutting gear box, it is sufficient to shift the selector provided on the change gear so as to provide for operativeness of gear wheel couples having different ratios.

This has for its result a modification of the rotary speed of the shaft provided with the clutch and, consequently, a modification in the rotary speed of the pinion meshing with the rack, so as to modify the longitudinal speed of movement of the saddle. The case is the same for the rotary sped of the threaded rod controlling the transverse carriage, whereby the transverse speed of the latter is modified.

The master screw is connected for thread-cutting purposes with the feed and thread-cutting gear box and, as described hereinbefore, it controls the worm wheel which controls, through the gear wheel rigid therewith, the change gear which, in its turn, transmits the movement to the rotary unit on the shaft carrying the worm wheel. Said unit includes, as mentioned hereinabove, an assembly of gear wheels and discs, which latter are provided, preferably at their periphery, with recesses or the like adapted to be engaged selectively by a roller rotatably mounted at the end of a rocking lever pivotally secured to the saddle. Said rocking lever may be shifted in a direction parallel with the axis of the unit considered, so as to set the roller selectively in vertical registry with any of the recessed discs. Said rocking lever is provided with a notch of a suitable shape inside which is urged a correspondingly shaped pusher member subjected to the thrust of a gauged spring, said thrust being exerted with a force sufficient for the roller to be held in one of the recesses of the above-mentioned discs, so as to prevent rotation of the unit and, consequently, of the worm wheel, which, when held thus fast against rotation, is driven along by the master screw together with the saddle at thread-cutting speed, for the execution of the thread previously selected through adjustment of the thread-cutting gear box. The force shifting the saddle has a value which is quite sufficient for ensuring operation of the thread-cutting tool, but it is purposely limited so that the pressure on the teeth of the worm wheel may remain at a normal value. To this end, the depth of the recesses is defined on each disc in a manner such that their reaction on the roller may become large enough either upon abutment of the saddle against one of its stops or, when the stress exerted on the thread-cutting tool becomes too large, for the disc-engaging lever to release the elastic pusher member engaging the notch in said lever, which has for its result to release the recessed disc end, thereby, the worm wheel which starts revolving freely, whereby the saddle stops progressing.

Simultaneously with the release of the roller, the rocking lever provides a receding movement of the transverse carriage or cross-slide and, consequently, of the thread-cutting tool under the action of an arrangement which has been previously set through depression of an outer lever controlling the position of the rocking leevr and the engagement of the roller inside the cooperating recess.

The gear ratios between the gear wheels forming the change gear, the gear wheels forming the unit fitted rotatably on the shaft carrying the worm wheel and the gear wheels driven thereby are calculated, taking into account the number of teeth on the worm wheel, so as to define on each different disc a uniformly spaced number of recesses, which allows, upon engagement of the roller in any one of said recesses, a stopping of the worm wheel in a preferred position on the master screw, which ensures a return of the thread-cutting tool, after it has been longitudinally shifted through manual or automatic control of the saddle into the thread which is being machined, whether said pitch be of a metric or other gauge, for which gauge the gear ratios of the gear wheels and the number of recesses in the coupled discs have been selected.

In order to obtain a completely satisfactory result with the preceding arrangements, there are associated with them the very important following structural arrangements:

The master screw which is made of quenched or treated steel and of which the thread and the outer surface are preferably trued, engages a bore in the saddle, which bore is provided with two roller bearings of a suitable breadth, inside which the master screw may revolve and slide with a limited clearance. Said roller bearings prevent any bending of the master screw during operation and they keep the spacing constant between the axes of the master screw and of the worm wheel and this, while ensuring a permanent meshing between the screw thread and the teeth of the worm wheel, cooperates in providing the desired accuracy and in reducing the wear to a minimum during a long operative life. Furthermore, in order to improve the behaviour of the screw and to ensure optimum efficiency in the transmission and uniformity of operation, the master screw is surrounded by telescopic tubes protecting it and which, when filled with frequently renewed oil, allow its operation, together with that of the worm wheel under continuous lubrication conditions inside a suitably closed chamber, whereby this mechanism of the slide lathe is protected against any projection of foreign substances and dust.

Further arrangements associated with those described hereinabove will appear in the reading of the following description, reference being made to the accompanying drawings, given solely by way of example and by no means in a limiting sense. In said drawings.

Figure 3:
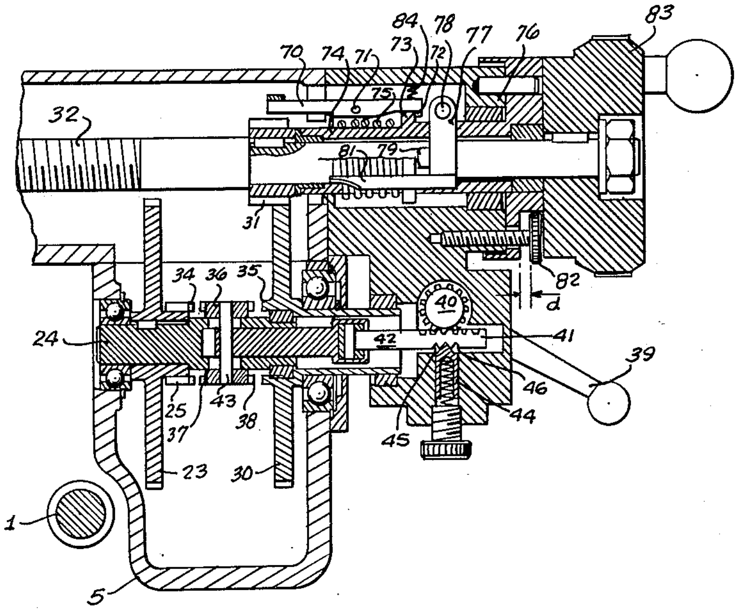
FIG. 3 is a transverse cross-section through line III—III of FIG. 1.
Figure 6:
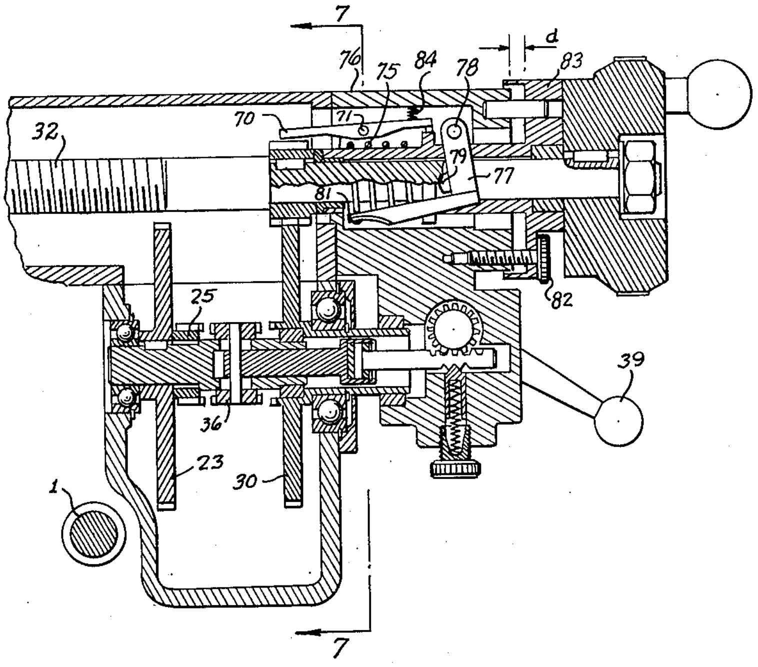

FIG. 6 corresponds to FIG. 3 for a different positioning of the parts.

Figure 1:
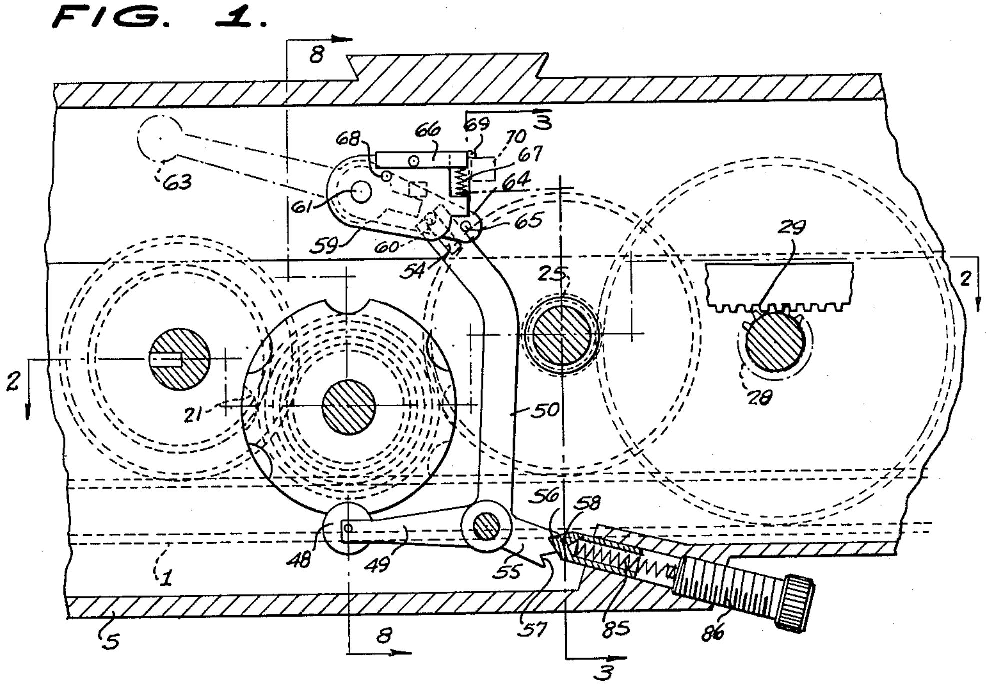
FIG. 1 is a front view of the rocking member and of its auxiliaries, together with the gear wheels.
Figure 8:
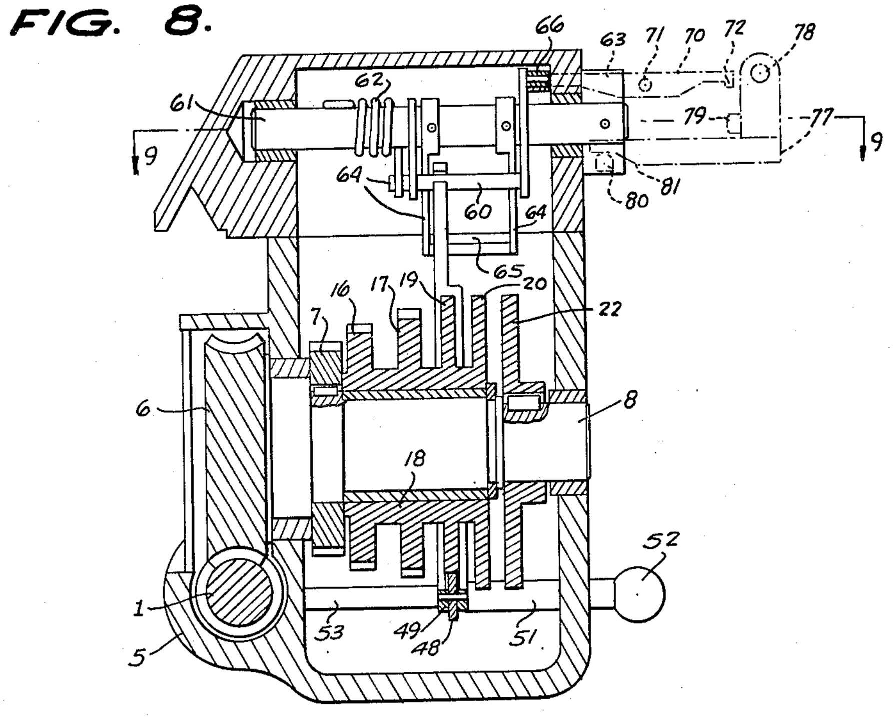

FIG. 8 is a cross-section through line VIII—VIII of FIG. 1.

Figure 9:
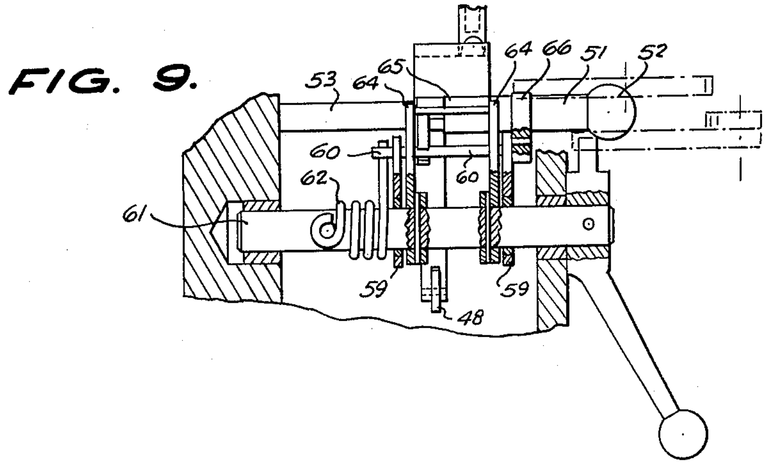
Figure 10:
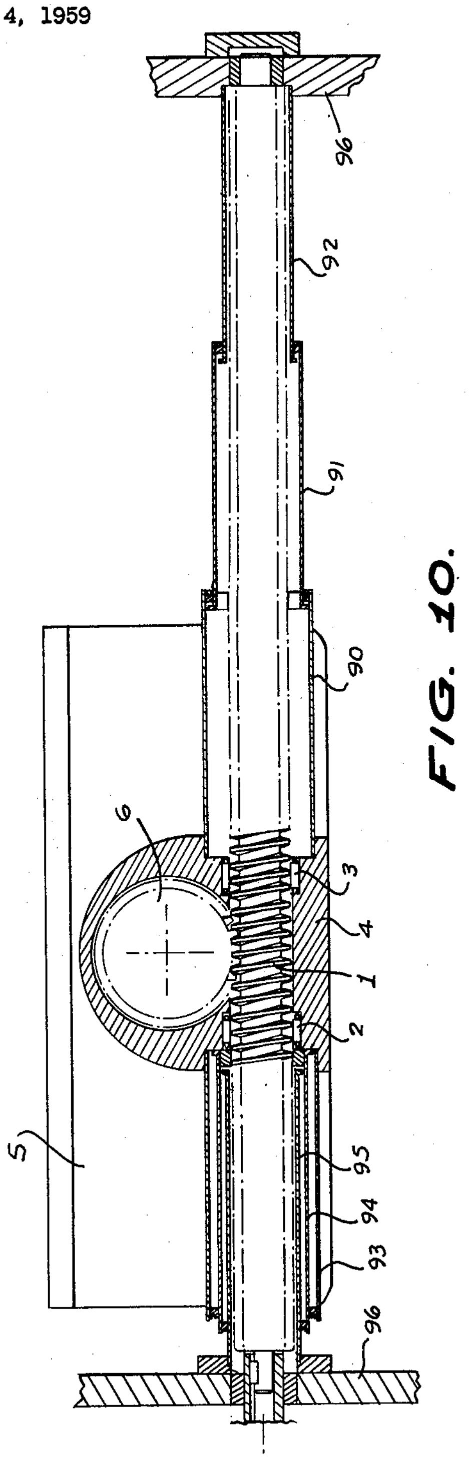

FIGS. 9 and 10 are detail views.

Figure 11:
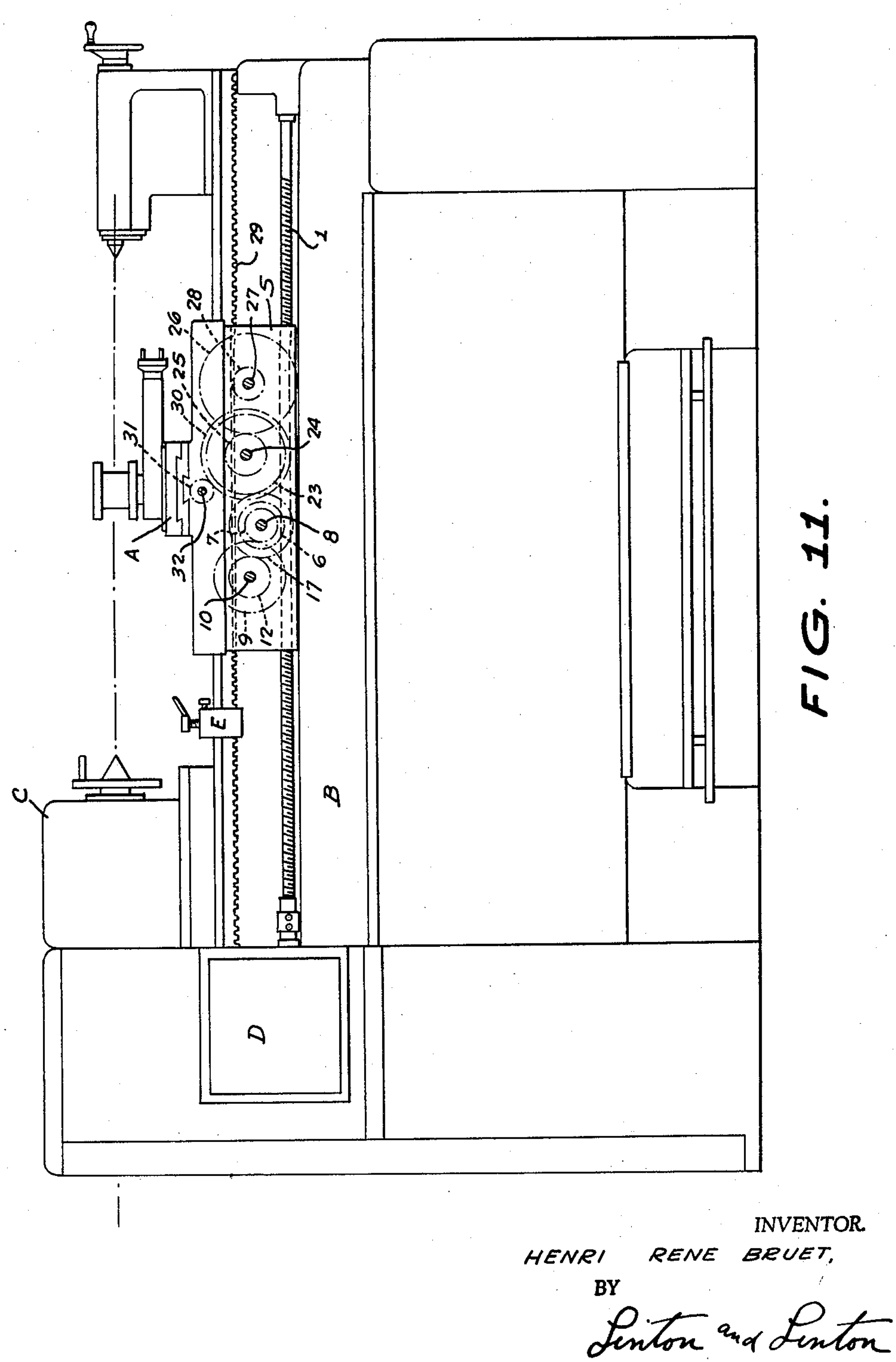

FIG. 11 is a front elevation of a lathe incorporating the present invention.

Figure 12:
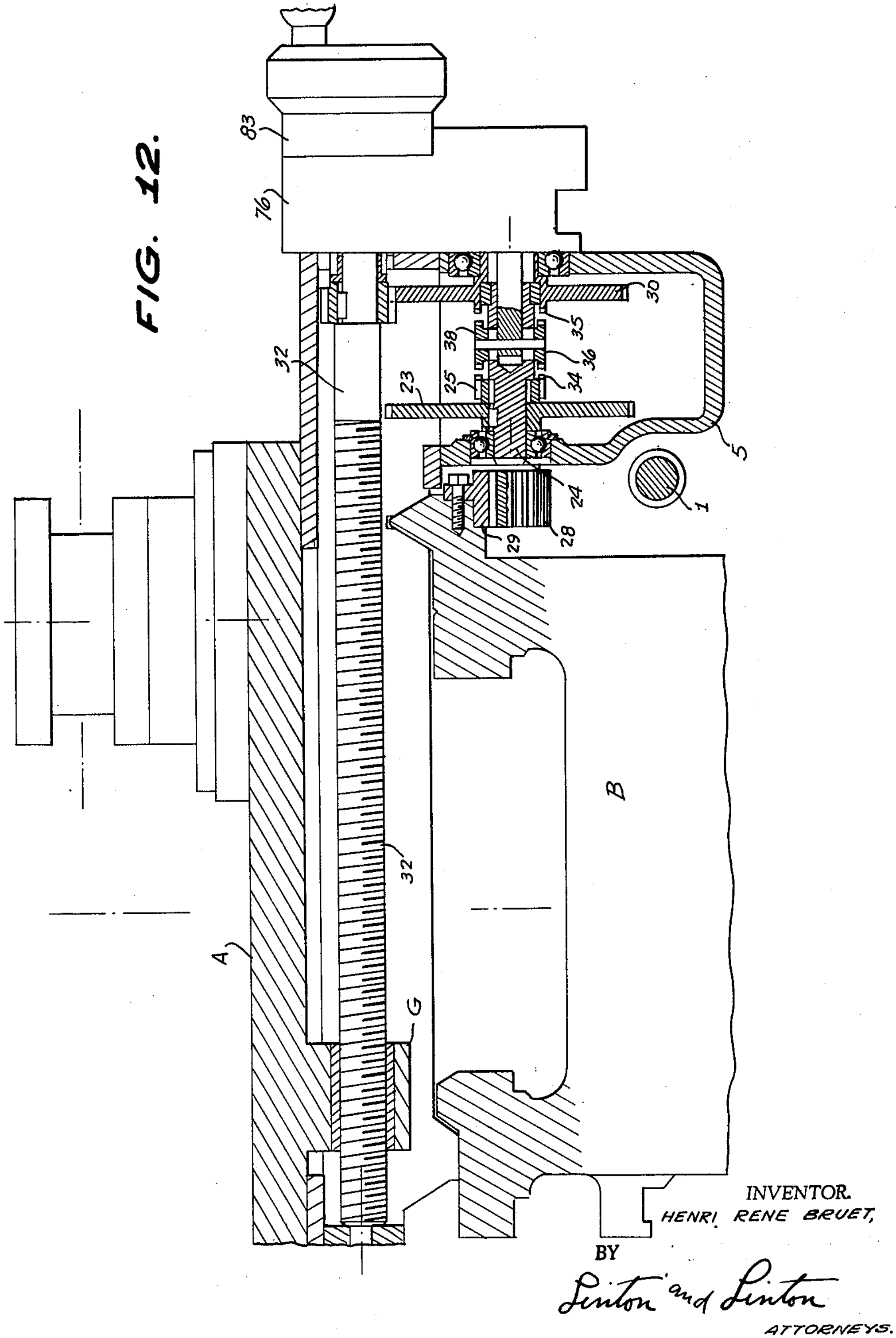

FIGURE 12 is a vertical sectional view through a portion of the lathe.

Turning to said drawings, the master screw 1 is coupled in any known manner with the feed and thread-cutting gear box D; said master screw is carried by two roller bearings 2 and 3 including preferably rollers of a length such that they engage at three or four points the threaded surface of the master screw 1. Said roller bearings 2 and 3 are housed inside an extension 4 on the main saddle 5. The master screw 1 meshes with the worm wheel 6 which is rigid as is the pinion 7 with the shaft 8 rotatably carried inside the saddle 5; the pinion 7 controls the wheel 9 rigid with the shaft 10 on which are revolvably fitted the pinions 11 and 12 adapted to rotate selectively in unison with said shaft 10 upon shifting in the corresponding direction, for instance, of a sliding key 14 forming a selector and adapted to be actuated by the sliding sleeve 15.

In the example illustrated, the number of pinions adapted to be selected is reduced to two, but, obviously, said number may be larger and defined in accordance with requirements. Said pinions 11 and 12 mesh selectively with the gear wheels 16 and 17 forming together a unit 18 with the discs 19 and 20, which latter are provided each at their periphery with a number of recesses 21 (FIG. 1), said unit revolving round the shaft 8 carrying the worm wheel 6. A further disc 22 similar to said recessed disc may be keyed directly, as illustrated, to the shaft 8 carrying the worm wheel 6. The pinion 16 meshes, on the other hand, with the wheel 23 rigid with the shaft 24. On said shaft 24 rotatably carried by the saddle or longitudinal slide 5, are rotatably mounted:

First, the pinion 25 meshing with the wheel 26 rigid with the shaft 27 also rotatably carried by the saddle 5 and rigidly carrying the pinion 28, said pinion meshing with a rack 29 integral with the bed B of the lathe.

Second, the toothed wheel 30 meshing, as clearly shown in FIG. 3, with the pinion 31 keyed to the threaded rod 32 controlling the transverse carriage A.

The pinion 25 and the toothed wheel 30 are provided with claws 34 and 35 having preferably oblique sides; a clutch component 36 rotating in unison with the shaft 24 and slidably carried by the latter carries further claws 37 and 38 adapted to engage the first-mentioned claws 34 and 35 respectively. The selective operation of the claws is controlled by the lever 39 when operated so that the pinion 40 carried by the latter turns around its pivotal axis and provides for the sliding of a rack 41 and, thereby, of the shaft 42 integral with the latter, said shaft 42 shifting the clutch component along the shaft 24 through the agency of the pin 43 interengaging said shaft 42 and said clutch component 36. The clutch component 36 may be held fast selectively in any of three longitudinal positions by a stud 44 urged elastically into the notches 45, 45' and 46 formed in the rack and shaft unit 41–42. The first position of the clutch component 36, as defined by engagement of the stud 44 in the central notch 45' and as illustrated in FIG. 3, corresponds to idle operation or disengagement. The second position of the clutch component 36 corresponding to the engagement of the stud 44 with the notch 45 provides for engagement between the claws 34 and 37, so as to make the pinion 25 rigid with the shaft 24; in its third position, the stud 44 engages the notch 46, whereby the claws 35 and 36 engage each other, so as to make the wheel 30 rigid with the shaft 24.

It is thus possible to obtain, for the gear train considered, two lines leading respectively to the rack 29 and to the threaded rod 32.

Under such conditions, the feed obtained by the feed and thread-cutting gear box D is transmitted either:

To the longitudinal carriage or saddle 5 through the agency of the master screw 1, the worm wheel 6, the pinion 7, the shaft 8, the wheel 9, the pinion 11 driven through the agency of the selecting key 14, the gear wheel 16, the wheel 23, and the shaft 24, the pinion 25, the claws 34 and 37, the wheel 26 and its shaft 27, the pinion 28 engaging the rack 29 rigid with the lathe bed.

Or to the transverse carriage A, so as to produce its transverse progression under the action of the master screw 1, the worm wheel 6, the pinion 7 and its shaft 8, the wheel 9, the gear 11 driven by its selecting key 14, the gear wheel 16, the wheel 23 and the shaft 24, as precedingly and then through the claws 35 and 38, the wheel 30 and the pinion 31 which is keyed to the threaded rod 32 controlling the transverse carriage A, as illustrated in FIG. 3.

The feed obtained for either the longitudinal 5 or transverse carriage A may, according to the invention, be modified through the agency of the change gear fitted on the shaft 10 and of the rotary unit fitted on the shaft 8, as operated by the selecting key 14 providing for engagement either of the pinion 11 or of the pinion 12, or again, of similar further pinions fitted revolvably in the same manner on the shaft 10. It is obvious that the substitution for the pinion 11 of the gear wheel 12 or of any other pinion, or reversely, will modify the rotary speed of the shaft 24, and, thereby, the rotary speed of the pinion 25 for the feed of the longitudinal carriage or of the wheel 30 controlling the feed of the transverse carriage A, as the case may be.

The following numeric examples will allow ascertaining the operation of the arrangement. It will be assumed that:

the master screw 1 carries a single thread;
the worm wheel 6 carries thirty teeth;
the gear wheel 7 carries forty-five teeth;
the gear wheel 9 carries thirty-two teeth;
the pinion 11 carries sixty-three teeth;
the gear wheel 16 carries fifty teeth;
the pinion 12 carries thirty-two teeth;
the gear wheel 17 carries forty-two teeth;
the gear wheel 23 carries ninety teeth.

When the pinion 11 is keyed to its shaft, there is obtained for one revolution of the master screw 1 by 360° a revolution of the toothed wheel 23 equal to:

$$\frac{1}{30}\times\frac{45}{32}\times\frac{63}{90}=\text{about }\frac{1}{30}$$

When the pinion 12 is keyed to its shaft instead of the pinion 11, there is obtained for each revolution of the master screw 1 a revolution of said toothed wheel 23 equal to:

$$\frac{1}{30}\times\frac{45}{32}\times\frac{32}{42}\times\frac{50}{90}=\text{about }\frac{1}{50}$$

Thus, the feed of the saddle 5 or of the transverse carriage A controlled by the threaded rod 32 will vary as between 1/30 and 1/50; in other words, the feed obtained in the second case will be equal to about 6/10 of the feed obtained in the first case.

The saddle 5 is driven by the master screw 1 with a power developing pressures which are distributed between the teeth of the worm wheel 6 and those of the rack 29. These pressures are reversely proportional to the displacements of the parts considered, so that, the shifting of the saddle being much smaller with reference to the rack 29 than the shifting of the teeth of the worm wheel 6, the latter are subjected to a much lower pressure than the teeth of said rack 29.

By way of example and if, as in the case considered hereinabove, the pitch of the master screw 1 is equal to 6 mm. and the shifting of the saddle 5, taking into account relative movement, is equal to about $\frac{6}{10}$ of a mm., the teeth of the worm wheel 6 will be subjected to $\frac{1}{10}$ of the traversing stress, while the nine other tenths are applied to the teeth of the rack 29.

The same is the case for transverse travelling. In order that the pressure exerted on the teeth of the worm wheel 6 may remain at a minimum under conditions otherwise the same, the above-mentioned gear train is designed in a manner such that the stresses exerted on the longitudinal carriage 5 through the shafts 8 and 27 may always face the same direction, while the rotation of said shafts is always performed in a uniform direction.

Figure 2:
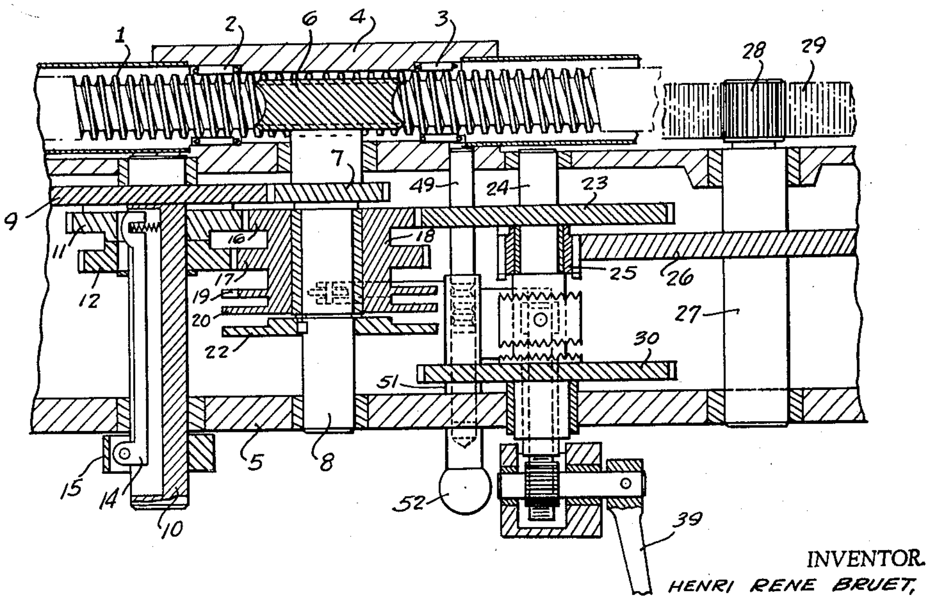
FIG. 2 is a sectional view through line II—II of FIG. 1.

During the execution of the threads, the clutch component 36 remains in its inoperative or idle position shown in FIGS. 2 and 3, so that only the following parts will be operative, as illustrated in FIGS. 1 to 7 and 11: thread-cutting gear box D, master screw 1, worm wheel 6, gear wheels 7 and 9, change gear fitted on the shaft 10, unit 18 revolving round the shaft 8, said parts cooperating with the rocking lever including two arms 49 and 50, which is rigid with a hollow shaft 51 at its pivot. Said hollow shaft is controlled by an outer knob 52 and may revolve and slide over the cylindrical rod 53 provided with notches holding it fast in selected longitudinal positions, said rod being carried by the saddle 5. The arm 49 of the rocking lever rotatably carries a roller 48 of any suitable shape and size, of a circular shape in the case illustrated with said roller being adapted to engage selectively the recesses of a variable depth such as 21 formed in a recessed disc. The other arm 50 of the rocking lever is provided with a mortise 54, while a broad extension 55 of the rocking lever near its pivot is provided with two notches 56 and 57 adapted to be engaged selectively by a stud 58 subjected to the thrust exerted by a gauged spring 85.

A rocker which includes two flanges 59 rigidly interconnected by a rod 60 is elastically secured to the shaft 61 (FIG. 9) by a spring 62 acting on said rod 60 engaging the mortise 54 provided in the arm 50 of the rocking lever. To the shaft 61 are pinned an auxiliary control lever 63 and the twin arms 64 interconnected by the cross-bar 65. Said cross-bar 65 is adapted to bear on the outside of the arm 50 of said rocking lever 49–50.

To a flange 59 of the rocker is pivotally secured a catch 66 subjected to the thrust of a spring 67 which urges it against a stop 68. Said catch 66 may impinge through its end 69 against a small lever 70 pivotally secured at 71 and provided with a nose 72 adapted to engage the rear side of a collar 73 on a tubular member 74 (FIG. 3) longitudinally rigid with the threaded rod 32 controlling the cross-slide. A spring 84 exerts a pressure on the small lever 70, so as to ensure its engagement with the rear side of said collar 73.

In the position illustrated in FIG. 3, a spring 75 is held under compressed conditions between the collar 73 and a flange provided inside the member 76 secured to the front wall of the saddle 5 (FIG. 6).

A bell crank 77 pivotally secured to the member 76 through a pivot 78 is adapted to engage through projections 79 the collar 73 on the tubular member 74. An extension 80 of the control lever 63 engages the underside of the arm 81 of the bell crank 77 (FIG. 7).

The hereinbefore described arrangement permits the cutting of threads in the following manner: the pitch is adjusted through the thread-cutting gear box D connected in the conventional manner with the spindle of the lathe. The lathe is then started operating.

The master screw 1 in operative engagement with the thread-cutting gear box D controls the worm wheel 6, the shaft 8, the gear wheel 7 driving the gear wheel 9 and the change gears on the shaft 10, while, the selecting key 14 being set in the position illustrated in FIG. 2, the pinion 11 provides for the rotation of the gear wheel 16 and, consequently, of the unit 18, which revolves freely without any action on the saddle 5.

Figure 7:
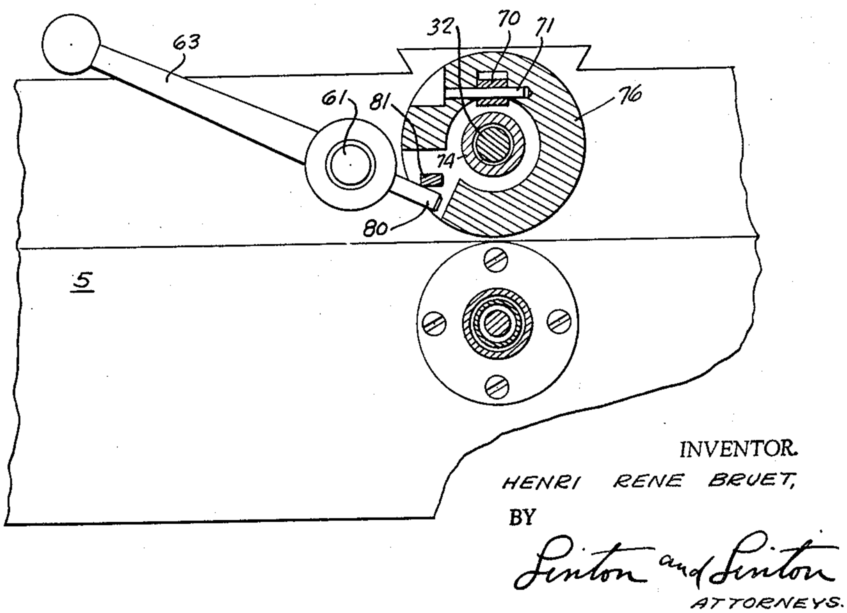

The transverse carriage A or cross-slide carrying the thread-cutting tool which is not illustrated and which has been urged back by the threaded rod 32 is set back, for instance by a distance $d$, which is adjustable through operation of the screw 82 acting as a stop with reference to the saddle or longitudinal carriage 5, and the above-mentioned parts are then in the position illustrated in FIGS. 6 and 7, which show the lever 70 in its rocked position as a result of which it has disengaged the collar 73, the spring 75 having expanded by an amount equal to the spacing *d*, while the bell crank 77 has been urged by the collar 73 into a position for which its end 81 engages the extension 80 of the lever 63, which is thus held in its disconnected position.

Figure 5:
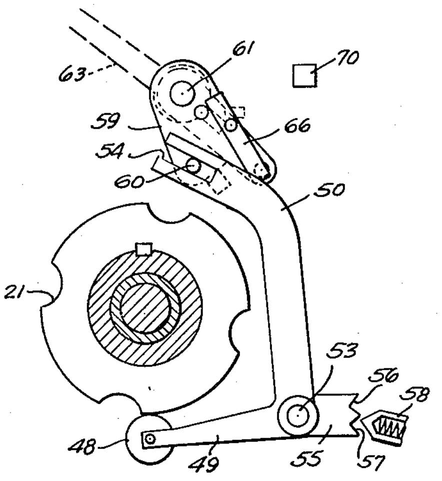

The rocking lever 49–50, the rocker 59–60, the catch 66 and the associated parts are then in a position similar to that illustrated in FIG. 5, except for the fact that the stud 58 is housed inside the notch 57, so as to provide a stable position for said rocking lever 49–50.

The thread-cutting operation is now performed as follows: the thread-cutting tool is brought into a suitable starting position and the cut is executed by adjusting the threaded rod 32 through the vernier 83 and the roller 48 is set in registry with one of the peripherally recessed discs by shifting the rocking lever 49–50 through the knob 52. This being done, the outer control lever 63 is depressed, so as to shift elastically through the spring 62 the flange 59 forming part of the rocker, the rod 60 of which engaging the mortise 54 acts on the arm 50 of the rocking lever, the other arm 49 of which urges the roller 48 into engagement with the periphery of the selected recessed disc. At the same time, the end 80 of the lever 63 raises the end 81 of the bell crank 77 (FIG. 7), which urges through its projections 79 the collar 73 into a position compressing the spring 75, so as to urge the nose of the lever 70 subjected to the pressure of the spring 84 into engagement with the rear of the collar 73, as illustrated in FIG. 3, for which position the transverse carriage A is held in its operative position.

Under such conditions, the recessed disc is driven into rotation and one of its recesses 21 registers with the roller 48 urged elastically against the periphery of the disc by the lever 63 and the spring 62. The roller 48 will then engage the recess 21 and assume the position illustrated in FIGS. 1 and 4. This being done, the flanged rocker 59–60 enters the position illustrated in FIGS. 1 and 4, and the nose 69 on the catch 66 extends over the end of the lever 70.

Simultaneously with the engagement of the roller 48 inside the recess 21, the stud 58 is urged into the notch 56 by the spring 85 which is adjusted, if required, by the screw 86 (FIG. 1), the thrust exerted by said spring 85 being such that the roller 48 holds the recessed discs fast and prevents their rotation through application of a sufficiently large and well-defined force.

The stopping of the rotation of the recessed discs 21 leads to a stopping of the rotation of the above-mentioned parts which were previously loose.

The worm wheel 6 which is held fast against rotation is then carried along with its shaft 8 and the saddle 5 by the master screw 1 at the selected thread-cutting speed corresponding to the pitch of the thread to be cut.

On the other hand, there is provided on the bed of the lathe an abutment E and which limits the stroke of the longitudinal carriage or saddle and forms a stop for the end of the thread-cutting operation.

When said saddle 5 engages said abutment, the master screw 1, which continues rotating, exerts an increasing stress on the teeth of the worm wheel 6 and makes the latter rotate. Said stress is transmitted to the disc, of which one of the recesses 21 is engaged by the cooperating roller 48, so that the latter is urged out of the recess when the reaction has reached a sufficiently high value. The mechanism is thus returned into a position for which the stud 58 engages the notch 57, so that said position is substantially that illustrated in FIG. 5.

During this movement, the arm 50 of the rocking lever acts through its mortise 54 on the rocker 59–60, so that the flanges 59 of said rocker and the catch 66 are returned into the position illustrated in FIG. 5. The rocking movement of the catch 66 causes it to engage, through its end 69, the lever 70 which rocks and enters the position illustrated in FIG. 6 for which the collar 73 is released and the spring 75 urges the vernier 83 into engagement with the stop 82. This produces a shifting of the threaded rod 32 and, consequently, of the transverse carriage and of the thread-cutting tool which is now spaced from the thread which is being cut by a distance *d*. The end 81 of the bell crank 77 engages the extension 80 of the lever 63 which is returned into its disconnected position, as illustrated in FIG. 3.

The saddle 5 may now be returned together with the thread-cutting tool into its starting position through any suitable means, whence it may start for a further cycle of operations similar to the preceding cycle, after the vernier 83 has been adjusted for a further cut value.

In all cases, it is of a major importance, for sake of speed and reliability of the machining, for the thread-cutting tool to enter the thread which has been roughly cut before with perfect accuracy and without any trying. This is obtained through the kinematic connection provided by the improved transmission disclosed both for metric pitches and for Whitworth pitches.

In order to illustrate the mechanism of this return of the tool inside the thread at the beginning of each cut, it appears preferable to give a few numeric examples wherein the gear wheels and the arrangements used will be partly the same as those which have served in the example showing the adjustment of the feed through operation of the selected key on the saddle 5.

(A) *First Example—Metric Pitch*

*First case.*—The recessed discs are keyed directly to the shaft 8 of the worm wheel 6. Assuming the master screw 1 is provided with a thread of a pitch of 6 mm., a worm wheel carries thirty teeth and the disc is provided with six recesses, said disc will allow reengagement of the tool with a thread of a pitch of 30 mm. and of all the sub-multiples of 30 mm. As a matter of fact, if the disc 20 is to execute one revolution, it is necessary for the master screw to execute thirty revolutions, which corresponds to a development or peripheral travel of $6\times30=180$ mm.; since the disc 20 is provided with six recesses engageable selectively by the roller 48, the reengagement is performed for a pitch of $180:6=30$ mm. and of any sub-multiple thereof.

For a disc keyed in the same angular position, but provided with ten recesses, which disc is not illustrated, the reengagement is performed within a thread of a pitch of $180:10=18$ mm. and all sub-multiples of 18 mm.

*Second case.*—Assuming the selecting key 14 provided for the drive of the gear wheel 12, so as to make the gear wheels 7, 9, 12 and 17 operative, the disc 20 will execute for one complete revolution of the master screw 1 a fraction of a revolution equal to:

$$\frac{1}{30}\times\frac{45}{32}\times\frac{32}{42}=\frac{1}{28}$$

and if the disc 20 is to execute a complete revolution through 360°, it is necessary for the master screw 1 to execute twenty-eight revolutions, to wit a peripheral movement of $6\times28=168$ mm.

If the disc 20 is provided with fourteen recesses, it will allow the reengagement of the tool into a thread of a pitch of $168:14=12$ mm. and of all the pitches equal to sub-multiples of 12.

In the case of a disc with four recesses, it is possible to reengage the tool in threads of pitches equal to $168:4=42$ mm. and of all pitches which are sub-multiples of 42.

(B) *Second Example—Whitworth Pitch*

In order to avoid using a wheel of 127 teeth on the saddle, it is possible to resort to gear wheels giving a value of the inch which is very near its true value.

The speed-reducing ratio between the spindle of the lathe which is not illustrated and the master screw 1 is obtained, for instance, first by a ratio of from 4 to 3 and then by a pair of gear wheels including a fifty-teeth driving wheel and a sixty-teeth driven wheel, so as to obtain for each revolution of the spindle a revolution of the master screw 1 by:

$$\frac{4}{3}\times\frac{50}{63}=\frac{200}{189}$$

which provides for the 6 mm. pitch a shifting of:

$$6\times\frac{200}{189}=6.3492 \text{ mm.}$$

which corresponds substantially to one quarter of an inch with an error of less than one thousandth of a millimeter. Under such conditions, if the selecting key 14 engages the gear wheel 11, as illustrated in FIG. 2, the gear wheel 16 will execute a fraction of a revolution equal to:

$$\frac{4}{3}\times\frac{50}{63}\times\frac{1}{30}\times\frac{45}{32}\times\frac{63}{50}=\frac{1}{16}$$

each time the lathe spindle has executed a complete revolution through 360°. Assuming the unit 18, which is rigid with the wheel 16, includes discs such as 19 and 20, provided with one, two, four or more recesses such as 21, the engagement of the roller 48 in any of said recesses will allow the tool to engage different cut pitches of Whitworth gauge, for which said discs are provided.

In the case where the accuracy required were to lead between the spindle and the master screw to a ratio providing shifting by one quarter of an inch, i.e. 6.35 mm., the wheels used in the thread-cutting gear box will include a driving wheel of 127 teeth and a driven wheel of 120 teeth so as to form the ratio 127/120 adapted to produce for one revolution of the spindle a development or peripheral travel of $$6\times\frac{127}{120}=6.35 \text{ mm.}$$

for the master screw, as required.

In the parts fitted on the saddle 5, the pinion 11 will carry 120 teeth and the wheel 16 127 teeth, so that for each revolution of the spindle, the wheel 16 executes a fraction of a revolution equal to:

$$\frac{127}{120}\times\frac{1}{30}\times\frac{45}{24}\times\frac{120}{127}=\frac{1}{16}$$

as in the preceding case, so that the tool will reengage the thread of a corresponding pitch.

In the two examples disclosed hereinbefore, it will be remarked that, according to the invention, the speed-reducing ratio between the coupled wheels in the thread-cutting box D, to wit: 50/63 or 127/120 which allow obtaining Whitworth pitches are reversed with reference to the ratios 63/50 or 120/127 of the operative gear wheels on the shaft of the change gear 10 and on the shaft 8 of the unit 18 which are engaged by the selecting key 14, so as to obtain reengagement of the tool in Whitworth gauge threads.

The thread-cutting procedure described hereinabove may be disclosed with further detail in the following manner:

A stop E is positioned on the lathe bed, in the position corresponding to the end of the thread to be machined.

The desired pitch is selected in the thread-cutting gear box D and, upon drawing or pushing of the knob 52, the rocking lever 49–50 is set, so as to position the roller 48 in registry with a disc such as 19, 20 or 22, the number of recesses 21 of which corresponds to the pitch to be obtained.

The selecting key 14 is then shifted, so as to provide operation of that gear wheel 11 or 12, which corresponds to the gear ratio providing the desired rotation for the selected disc.

In order to execute said operations easily, speedily and accurately, indications are carried by the shaft 10 over which moves the sleeves 15 controlling the selecting key 14 and further indications are carried also on the tubular shaft 51 rigid with the rocking lever 49–50.

This being done, the saddle 5 and the transverse carriage A carrying the thread-cutting tool are brought into the position corresponding to the beginning of the thread-cutting operation.

The first cut is obtained after adjustment of the vernier 83. The control lever 63 is depressed home until the roller 48 engages one of the recesses 21 of the selected disc. This engagement is readily felt by the operator who will immediately thereupon release the lever 63.

Figure 4:
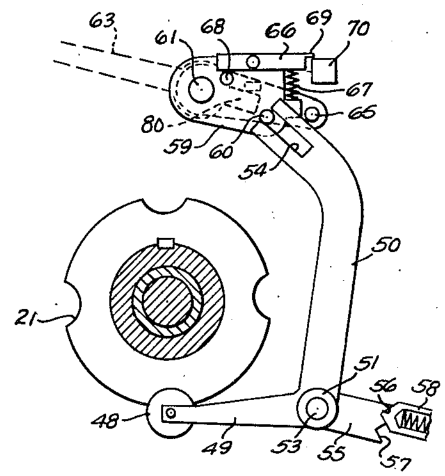
FIGS. 4, 5 and 7 show details for different operative positions thereof.

At this moment, the arrangement is in the position illustrated in FIGS. 1 and 4. The worm wheel 6 is held fast against rotation, so that the saddle 5 starts moving at the speed corresponding to the desired thread-cutting operation.

When the saddle 5 engages the stop E secured to the lathe bed, the worm wheel 6 urges the lever 48 out of the cooperating disc and the saddle stops simultaneously with the shifting of the transverse carriage and thread-cutting tool, away from the thread which is being machined by the distance *d* defined by the adjusted stop 82 in conformity with the above disclosure.

The saddle 5 is now returned into the position corresponding to the beginning of the cut and the vernier 83 is adjusted as a preparation for the next cut. The lever 63 is again depressed home, so as to start the same movements as those which have been previously described.

By reason of the selection of the disc in which the number of recesses has been chosen according to the selected pitch, the engagement of the roller 48 into the first recess registering with it holds the worm wheel 6 fast with reference to the master screw 1 in an accurate position for which the thread-cutting tool drops accurately inside the thread which has been previously roughly cut.

The same operations will be repeated until the thread has been machined down to its finished measurement.

In addition to the speedy, accurate and convenient execution ensured by the arrangement disclosed, it should be mentioned that said arrangement is particularly advantageous for the execution of threads stopping in registry with a bearing or for the machining of tappings.

In order that, during the cutting of threads of various pitches, the pressure exerted by the thread of the master screw 1 on the teeth of the worm wheel may remain comparatively near the normal pressure selected for a minimum wear, it is possible, according to the invention, to give the recesses 21 a more or less considerable depth.

The stopping of the traversing and thread-cutting movements during the machining are obtained as follows during longitudinal or transverse traversing through the setting of the clutch component 36 in its idle position. As to the thread-cutting operation, its stoppage is obtained through a raising of the lever 63, which bears, through the bar 65 connecting the arms 64, against the back of the arm 50 of the rocking lever 49–50 which rocks then around its pivot 53 and thereby releases the roller 48 with reference to the recess engaged by it and returns the arrangement into the position illustrated in FIG. 5, for which the worm wheel 6 is released, while simultaneously the thread-cutting tool is shifted outwardly and the saddle 5 stops as already disclosed.

In order to retain, during a long period of operation and without any substantial wear, the accuracy and the high efficiency of the transmission described, it is of advantage to incorporate particularly efficient lubricating and protecting means with the parts which are the most subject to wear and to fouling, such as, for instance, the master screw 1 and the worm wheel 6.

FIG. 10 illustrates an efficient protecting system constituted by a plurality of telescopic tubes, of which two shown at 90 and 93 are let in with slit and tongue inside the expanded end 4 of the saddle 5, while two other elementary tubes 92 and 95 are coaxially carried by the bed 96 of the lathe. Intermediate coaxial tubes 91 and 94 provide for perfect fluidtightness of said telescopic arrangement.

Through this arrangement, the master screw 1 and the worm wheel 6 are housed inside a practically fluidtight chamber, both under operative and inoperative conditions during the reciprocation of the saddle 5. This chamber is then filled with oil tapped preferably off the lubricating circuit of the lathe. Obviously, under such conditions, the wear will be reduced to a minimum, all other conditions remaining similar, while the efficiency of the transmission will remain constantly equal to a maximum.

It is also possible, in accordance with the present invention, to use recessed discs keyed directly to the shaft of the worm wheel for the obtention of certain pitch values.

Obviously, the arrangements described are given solely by way of examples and in a non-limiting sense and various modifications and auxiliary arrangements may be incorporated with the arrangement, without widening the scope of the invention as defined by the accompanying claims, which invention is applicable to all types of lathes and machine-tools capable of association with the improved mechanism.

What I claim is:

1. A combined traversing and thread-cutting mechanism for a slide lathe including a cross-slide and the like thread-cutting machine tools comprising a lathe saddle, a master screw rotatably and slidingly carried by said saddle, a worm wheel meshing with said master screw, a shaft rotatably mounted on said saddle and having said worm wheel fixedly mounted thereon, a pinion fixedly mounted on said shaft, a second shaft parallel with said first shaft, a second pinion fixedly mounted on said second shaft and meshing with said first pinion, a change gear including at least two gear wheels rotatably mounted on said second shaft and a key slideably mounted on said second shaft adapted to rigidly connect said gear wheels selectively to said second shaft, a unit rotatably mounted on said first shaft and including toothed wheels meshing with the cooperating gear wheels of said change gear, and at least two discs provided with recesses distributed uniformly along a circle coaxial with said unit, said discs and toothed wheels being coaxially rigid with one another, means for selectively and elastically restraining said discs against rotation and thereby said worm wheel whereby said worm wheel shifts said saddle upon operation of said master screw, a third shaft rotatably carried by said saddle, a further toothed wheel keyed to said third shaft and meshing permanently with one of the toothed wheels of said unit, a clutch component slidably mounted on said third shaft and connected thereto for rotation therewith, two clutch wheels rotatably carried by said third shaft each on an opposite side of said clutch component for being engaged selectively and operatively by said clutch component, a stationary rack, means operatively connected to one of said clutch wheels on said third shaft and said stationary rack for controlling the longitudinal shifting of said saddle, and a threaded rod controlling the transverse shifting of the lathe cross-slide operatively connected to the other of said clutch wheels.

2. A combined traversing and thread-cutting mechanism for a slide lathe including a cross-slide and thread cutting tool and the like thread-cutting machine tools comprising a lathe saddle, a master screw rotatably and slidingly carried by said saddle, a worm wheel meshing with said master screw, a shaft rotatably mounted on said saddle and having said worm wheel fixedly mounted thereon, a pinion fixedly mounted on said shaft, a second shaft parallel with said first shaft, a second pinion fixedly mounted on said second shaft and meshing with said first pinion, a change gear including at least two gear wheels rotatably mounted on said second shaft and a key slideably mounted on said second shaft adapted to rigidly connect said gear wheels selectively to said second shaft with the gear wheel selected by said key providing an adjustment of the traversing feed and return of the thread-cutting tool, a unit rotatably mounted on said first shaft and including toothed wheels meshing with the cooperating gear wheels of said change gear, and at least two discs provided with recesses distributed uniformly along a circle coaxial with said unit, said discs and toothed wheels being coaxially rigid with one another, means for selectively and elastically restraining said discs against rotation and thereby said worm wheel whereby said worm wheel shifts said saddle upon operation of said master screw, a third shaft rotatably carried by said saddle, a further toothed wheel keyed to said third shaft and meshing permanently with one of said toothed wheels of said unit, a clutch component slidably mounted on said third shaft and connected thereto for rotation therewith, two clutch wheels rotatably carried by said third shaft each on an opposite side of said clutch component for being engaged selectively and operatively by said clutch component, a stationary rack, means operatively connected to one of said clutch wheels on said third shaft and said stationary rack for controlling the longitudinal shifting of said saddle, and a threaded rod controlling the transverse shifting of the lathe cross-slide operatively connected to the other of said clutch wheels.

3. A combined traversing and thread-cutting mechanism for a slide lathe including a cross-slide and the like thread-cutting machine tools comprising a lathe saddle, a master screw rotatably and slidingly carried by said saddle, a worm wheel meshing with said master screw, a shaft rotatably mounted on said saddle and having said worm wheel fixedly mounted thereon, a pinion fixedly mounted on said shaft, a second shaft parallel with said first shaft, a second pinion fixedly mounted on said second shaft and meshing with said first pinion, a change gear including at least two gear wheels rotatably mounted on said second shaft and a key slidably mounted on said second shaft adapted to rigidly connect said gear wheels selectively to said second shaft, a unit rotatably mounted on said first shaft and including toothed wheels meshing with the cooperating gear wheels of said change gear, and at least two discs provided with uniformly distributed peripheral recesses, said discs and toothed wheels being coaxially rigid with one another, a rocking lever pivotally secured to said saddle on an axis parallel with the axis of said worm wheel and adapted to move along its pivotal axis into registry with any one of said recessed discs, a roller rotatably carried at one end of said lever and adapted to engage a recess in the disc registering with said lever, means elastically holding said lever in the position in which said roller engages a recess in the disc cooperating therewith to hold said disc angularly fast and thereby said worm wheel fast against rotation to constrain said worm wheel to be shifted with said saddle upon operation of said master screw, a third shaft rotatably carried by said saddle, a further toothed wheel keyed to said third shaft and meshing permanently with one of said toothed wheels of said unit, a clutch component slidably mounted on said third shaft and connected thereto for rotation therewith, two clutch wheels rotatably carried by said third shaft each on an opposite side of said clutch component for being engaged selectively and operatively by said clutch component, a stationary rack, means operatively connected to one of said clutch wheels on said third shaft and said stationary rack for controlling the longitudinal shifting of said saddle, and a threaded rod controlling the transverse shifting of the lathe cross-slide operatively connected to the other of said clutch wheels.

4. A combined traversing and thread-cutting mechanism for a slide lathe including a cross-slide and the like thread-cutting machine tools comprising a lathe saddle, a master screw rotatably and slidingly carried by said saddle, a worm wheel meshing with said master screw, a pinion, a spindle fixedly carrying said pinion and worm wheel therewith and being rotatably carried by said saddle, a shaft parallel with said spindle and operatively connected to said pinion, a change gear including at least two gear wheels rotatably mounted on said shaft and a key slidably mounted on said shaft for engaging and rigidly connecting said gear wheels selectively to said shaft, a unit rotatably mounted on said spindle and including toothed wheels meshing with cooperating gear wheels of said change gear, and at least two discs provided with recesses distributed uniformly along a circle coaxial with said unit, said discs and toothed wheels being coaxially rigid with one another, means for selectively and elastically restraining said discs against rotation and thereby said worm wheel whereby said worm wheel shifts said saddle upon operation of said master screw, a second shaft rotatably carried by said saddle, a further toothed wheel keyed to said second shaft and meshing permanently with one of the toothed wheels of the unit, a clutch component slidably mounted on said second shaft and connected thereto for rotation therewith, two clutch wheels rotatably carried by said second shaft each on an opposite side of said clutch component for being engaged selectively and operatively by said clutch component, a stationary rack operatively connected to one of said clutch wheels on said second shaft for thereby controlling the longitudinal shifting of said saddle, and a threaded rod controlling the transverse shifting of the lathe cross-slide operatively connected to the other of said clutch wheels on said second shaft, said saddle being subjected to the action of the forces transmitted by said worm wheel spindle and by said second shaft.

5. A combined traversing and thread-cutting mechanism for a slide lathe including a cross-slide and the like thread-cutting machine tools comprising a lathe saddle, a master screw rotatably and slidingly carried by said saddle, a worm wheel meshing with said master screw, a pinion, a shaft rotatably mounted on said saddle and having said worm wheel and pinion fixedly mounted thereon, a second shaft rotatably mounted on said saddle parallel to said first shaft and operatively connected to said pinion, a change gear including at least two gear wheels rotatably mounted on said second shaft and a key slidably mounted on said second shaft for rigidly connecting said gear wheels selectively to said second shaft, a unit rotatably mounted on said first shaft including toothed wheels meshing with the cooperating gear wheels of said change gear, and at least two discs provided with recesses distributed uniformly along a circle coaxial with said unit, said discs and toothed wheels being coaxially rigid with one another, means for selectively and elastically restraining said discs against rotation and thereby said worm wheel whereby said worm wheel shifts said saddle upon operation of said master screw, a third shaft rotatably carried by said saddle, a further toothed wheel keyed to said third shaft and meshing permanently with one of the toothed wheels of said unit, a clutch component slidably mounted on said third shaft and connected thereto for rotation therewith, two clutch wheels rotatably carried by said third shaft each on an opposite side of said clutch component for being engaged selectively and operatively by said clutch component, a stationary rack operatively connected to one of said clutch wheels on said third shaft for thereby controlling the longitudinal shifting of said saddle with the pressure exerted on said saddle being distributed into a smaller pressure exerted on the teeth of said worm wheel and a much larger pressure exerted on said rack teeth, a threaded rod controlling the transverse shifting of the lathe cross-slide operatively connected to the other of said clutch wheels on said third shaft.

6. A combined traversing and thread-cutting mechanism for a slide lathe including a cross-slide and the like thread-cutting machine tools comprising a lathe saddle, a master screw rotatably and slidingly carried by said saddle, a worm wheel meshing with said master screw, a pinion, a shaft rotatably mounted on said saddle and having said worm wheel and pinion fixedly mounted thereon, a second shaft rotatably mounted on said saddle parallel to said first shaft and operatively connected to said pinion, a change gear including at least two gear wheels rotatably mounted on said second shaft and a key slidably mounted on said second shaft for rigidly connecting said gear wheels selectively to said shaft, a unit rotatably mounted on said first shaft including toothed wheels meshing with the cooperating gear wheels of said change gear, and at least two discs provided with uniformly distributed peripheral recesses, said discs and toothed wheels being coaxially rigid with one another, a rocking lever pivotally connected to said saddle on an axis parallel with the axis of said worm wheel and capable of moving along its pivotal axis into registry with any one of said recessed discs, a roller rotatably mounted at one end of said lever and capable of engaging a recess in the one of said discs registering with said lever, means elastically holding said lever in the position in which its roller engages a recess in the disc cooperating therewith to hold said disc angularly fast and thereby said worm wheel fast against rotation to constrain said worm wheel to be shifted with said saddle upon operation of said master screw, a third shaft rotatably carried by said saddle, a further toothed wheel keyed to said third shaft and meshing permanently with one of the toothed wheels of said unit, a clutch component slidably mounted on said third shaft, two clutch wheels rotatably carried by said third shaft each on an opposite side of said clutch component for being engaged selectively and operatively by said clutch component, a stationary rack operatively connected to one of said clutch wheels on said third shaft for thereby controlling the longitudinal shifting of said saddle, and a threaded rod controlling the transverse shifting of the lathe cross-slide operatively connected to the other of said clutch wheels on said third shaft, said discs recesses having a depth such that said roller is urged out of the cooperating recess under the action of continued rotation of said master screw upon the thread-cutting and said saddle meeting a hindrance with the force acting on said saddle during the thread-cutting operation thus ensuring operation of the lathe thread-cutting tool as long as the pressure exerted by the thread of said master screw on the teeth of said worm wheel does not rise above a value corresponding to normal machining.

7. A combined traversing and thread-cutting mechanism for a slide lathe including a cross-slide and the like thread-cutting machine tools comprising a lathe saddle, a master screw rotatably and slidingly carried by said saddle, a worm wheel meshing with said master screw, a pinion, a shaft rotatably mounted on said saddle and having said worm wheel and pinion fixedly mounted thereon, a second shaft rotatably mounted on said saddle parallel to said first shaft and operatively connected to said pinion, a change gear including at least two gear wheels rotatably mounted on said second shaft and a key slidably mounted on said second shaft for rigidly connecting said gear wheels selectively to said shaft, a unit rotatably mounted on said first shaft including toothed wheels meshing with the cooperating gear wheels of said change gear, and at least two discs provided with uniformly distributed peripheral recesses, said discs and toothed wheels being coaxially rigid with one another, a rocking lever pivotally connected to said saddle on an axis parallel with the axis of said worm wheel and capable of moving along its pivotal axis into registry with any one of said recessed discs, a roller rotatably mounted on one end of said lever and capable of engaging a recess in the one of said discs registering with said lever, means elastically holding said lever in the position in which its roller engages a recess in said disc cooperating therewith to hold said disc angularly fast and thereby said worm wheel fast against rotation to constrain said worm wheel from being shifted with said saddle upon operation of said master screw, a third shaft rotatably carried by said saddle, a further toothed wheel keyed to said third shaft and meshing permanently with one of the toothed wheels of said unit, a clutch component slidably mounted on said third shaft, two clutch wheels rotatably carried by said third shaft each on an opposite side of said clutch component for being engaged selectively and operatively by said clutch component, a stationary rack, a pinion meshing with said rack and one of said clutch wheels on said third shaft for controlling thereby the longitudinal shifting of said saddle, a threaded rod controlling the transverse shifting of the lathe cross-slide operatively connected to the other of said clutch wheels on said third shaft, means controlled by the stoppage of said saddle for releasing said roller out of the recess engaged by it, an adjustable stop for the lathe cross-slide, means operatively controlled by said rocking lever and capable of urging said cross-slide into engagement with said adjustable stop upon stoppage of said saddle and consequent release of said roller.

8. A combined traversing and thread-cutting mechanism for a slide lathe including a cross-slide and thread cutting tool and the like thread-cutting machine tools comprising a lathe saddle, a master screw rotatably and slidingly carried by said saddle, a worm wheel meshing with said master screw, a pinion, a shaft rotatably mounted on said saddle and having said worm wheel and pinion fixedly mounted thereon, a second shaft rotatably mounted on said saddle parallel to said first shaft and operatively connected to said pinion, a change gear including at least two gear wheels rotatably mounted on said second shaft and a key slidably mounted on said second shaft for rigidly connecting said gear wheels selectively to said second shaft, a unit rotatably mounted on said first shaft including toothed wheels meshing with the cooperating gear wheels of said change gear, and at least two discs provided with uniformly distributed peripheral recesses, said discs and toothed wheels being coaxially rigid with one another, a rocking lever pivotally connected to said saddle on an axis parallel with the axis of said worm wheel and capable of moving along its pivotal axis into registry with any one of said recessed discs, a roller rotatably mounted on one end of said lever and capable of engaging a recess in the one of said discs registering with said lever, means elastically holding said lever in the position in which its roller engages a recess in said disc cooperating therewith to hold said disc angularly fast and thereby said worm wheel fast against rotation to constrain said worm wheel from being rotated upon operation of said master screw, a third shaft rotatably carried by said saddle, a further toothed wheel keyed to said third shaft and meshing permanently with one of the toothed wheels of said unit, a clutch component slidably mounted on said third shaft, two clutch wheels rotatably carried by said third shaft each on an opposite side of said clutch component for being engaged selectively and operatively by said clutch component, a stationary rack, a pinion meshing with said rack and one of said clutch wheels on said third shaft for thereby controlling the longitudinal shifting of said saddle, and a threaded rod controlling the transverse shifting of the lathe cross-slide operatively connected to the other of said clutch wheels on said third shaft, the ratios between the different gear wheels of said change gear, the wheels of said unit and said pinion, said master screw and said worm wheel and the number of recesses in said discs being such that the engagement of said roller in a recess of the corresponding disc produces a shifting of said saddle to a predetermined position causing, upon return of the lathe cross-slide to its starting position, said thread-cutting tool to return accurately to the thread which is being machined.

9. A combined traversing and thread-cutting mechanism for a slide lathe including a cross-slide and the like thread-cutting machine tools comprising a lathe saddle, coaxial roller bearings of an elongated type mounted inside said saddle, a master screw rotatably and slidably carried inside said roller bearings and engaging the rollers of each bearing along at least three convolutions of its thread, a worm wheel meshing with said master screw, a pinion, a shaft rotatably mounted on said saddle and having said worm wheel and pinion fixedly mounted thereon, a second shaft rotatably mounted on said saddle parallel to said first shaft and operatively connected to said pinion, a change gear including at least two gear wheels selectively connected to said second shaft, a unit rotatably mounted on said first shaft including toothed wheels meshing with the cooperating gear wheels of said change gear, and at least two discs provided with recesses distributed uniformly along a circle coaxial with said unit, said discs and toothed wheels being coaxially rigid with one another, means for selectively and elastically restraining said discs against rotation and thereby said worm wheel whereby said worm wheel shifts said saddle upon operation of said master screw, a third shaft rotatably carried by said saddle, a further toothed wheel keyed to said third shaft and meshing permanently with one of the toothed wheels of said unit, a clutch component slidably mounted on said third shaft, two clutch wheels rotatably carried by said third shaft each on an opposite side of said clutch component for being engaged selectively and operatively by said clutch component, a stationary rack, a pinion meshing with said rack and one of said clutch wheels on said third shaft for thereby controlling the longitudinal shifting of said saddle, and a threaded rod controlling the transverse shifting of the lathe cross-slide operatively connected to the other of said clutch wheels on said third shaft.

10. A combined traversing and thread-cutting mechanism for a slide lathe including a cross-slide and the like thread-cutting machine tools as claimed in claim 1, wherein a fluidtight casing provided by a plurality of oil-filled interengaging telescopic tubes fitted in said saddle contains said master screw and said worm wheel.

References Cited in the file of this patent

UNITED STATES PATENTS

| | | |
|---|---|---|
| 409,456 | Darling | Aug. 20, 1889 |
| 834,359 | Buckley | Oct. 30, 1906 |
| 2,100,899 | Burger et al. | Nov. 30, 1937 |
| 2,482,786 | Mack | Sept. 27, 1949 |
| 2,736,243 | Armitage et al. | Feb. 28, 1956 |

FOREIGN PATENTS

| | | |
|---|---|---|
| 207,893 | Switzerland | Dec. 15, 1939 |
| 763,259 | Great Britain | Dec. 12, 1956 |
| 770,314 | Great Britain | Mar. 20, 1957 |